(12) United States Patent
Kamping

(10) Patent No.: US 6,964,326 B2
(45) Date of Patent: Nov. 15, 2005

(54) APPARATUS FOR DAMPING ROTATIONAL VIBRATIONS

(75) Inventor: Heinz-Hermann Kamping, Osnabrück (DE)

(73) Assignee: Timken GmbH, Halle/Westfalen (DE)

( * ) Notice: Subject to any disclaimer, the term of this patent is extended or adjusted under 35 U.S.C. 154(b) by 0 days.

(21) Appl. No.: 10/716,817

(22) Filed: Nov. 19, 2003

(65) Prior Publication Data

US 2004/0139942 A1     Jul. 22, 2004

(30) Foreign Application Priority Data

Nov. 29, 2002  (DE) ............................... 102 55 913

(51) Int. Cl.[7] .............................................. F16D 3/12
(52) U.S. Cl. ..................................... 192/55.5; 464/161
(58) Field of Search ............................. 192/55.5, 206; 464/160, 161

(56) References Cited

U.S. PATENT DOCUMENTS

| | | | |
|---|---|---|---|
| 5,205,788 A * | 4/1993 | Sacher et al. ................. | 464/61 |
| 5,517,957 A   | 5/1996 | Wagner et al. | |
| 5,855,518 A * | 1/1999 | Tanaka et al. ................ | 464/38 |
| 6,296,096 B1 * | 10/2001 | Chludek ................... | 192/58.41 |
| 6,620,066 B2 * | 9/2003 | Saluzzo et al. ............... | 474/74 |

FOREIGN PATENT DOCUMENTS

| | | | | |
|---|---|---|---|---|
| DE | 19919449 | | 11/1999 | |
| JP | 63186038 A | * | 8/1988 | ........... F16D 13/64 |

* cited by examiner

*Primary Examiner*—Richard M. Lorence
(74) *Attorney, Agent, or Firm*—Michael Best & Friedrich LLP

(57) ABSTRACT

An apparatus for damping rotational vibrations in a power train comprises a free-wheel clutch between a driving element and a driven element. At the outer ring and at the inner ring of the free-wheel clutch there are formed clamping ramps cooperating with clamping balls lying therebetween. The clamping ramps are provided at the axial front sides of the rings of the free-wheel. One of the rings of the free-wheel clutch is arranged axially undisplaceable and the other ring is arranged axially displaceable. Between the axially displaceable ring and an axial buttress there is provided a spring element acting in axial direction. Thereby the transmission of rotational vibrations onto the driving element can be prevented due to an axial displacement of the constructional parts arranged therebetween up to their clamping, particularly with an increasing number of revolutions of the driving element.

14 Claims, 2 Drawing Sheets

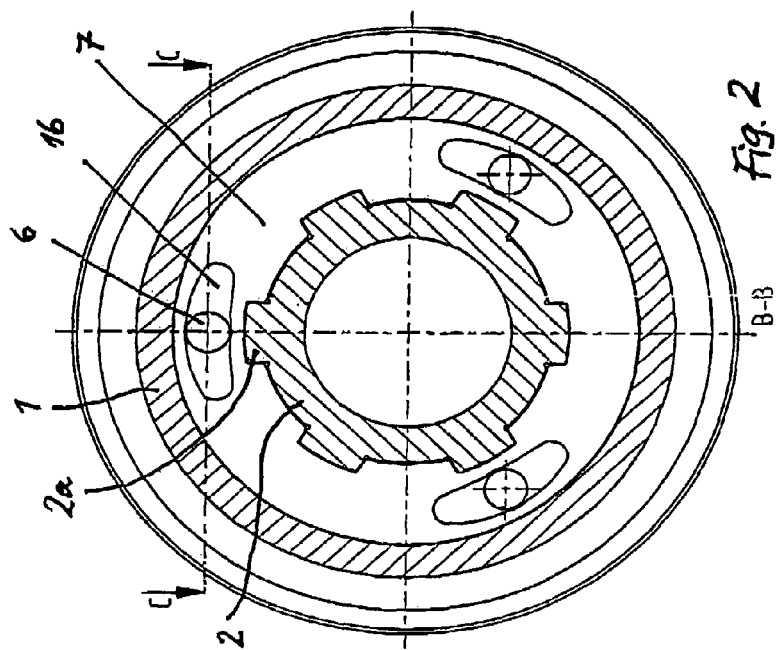
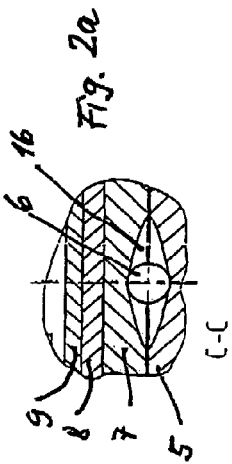
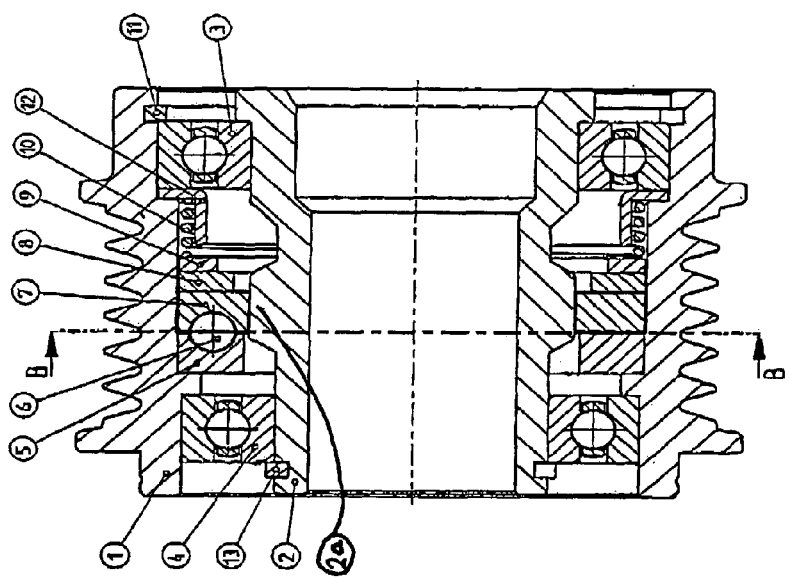

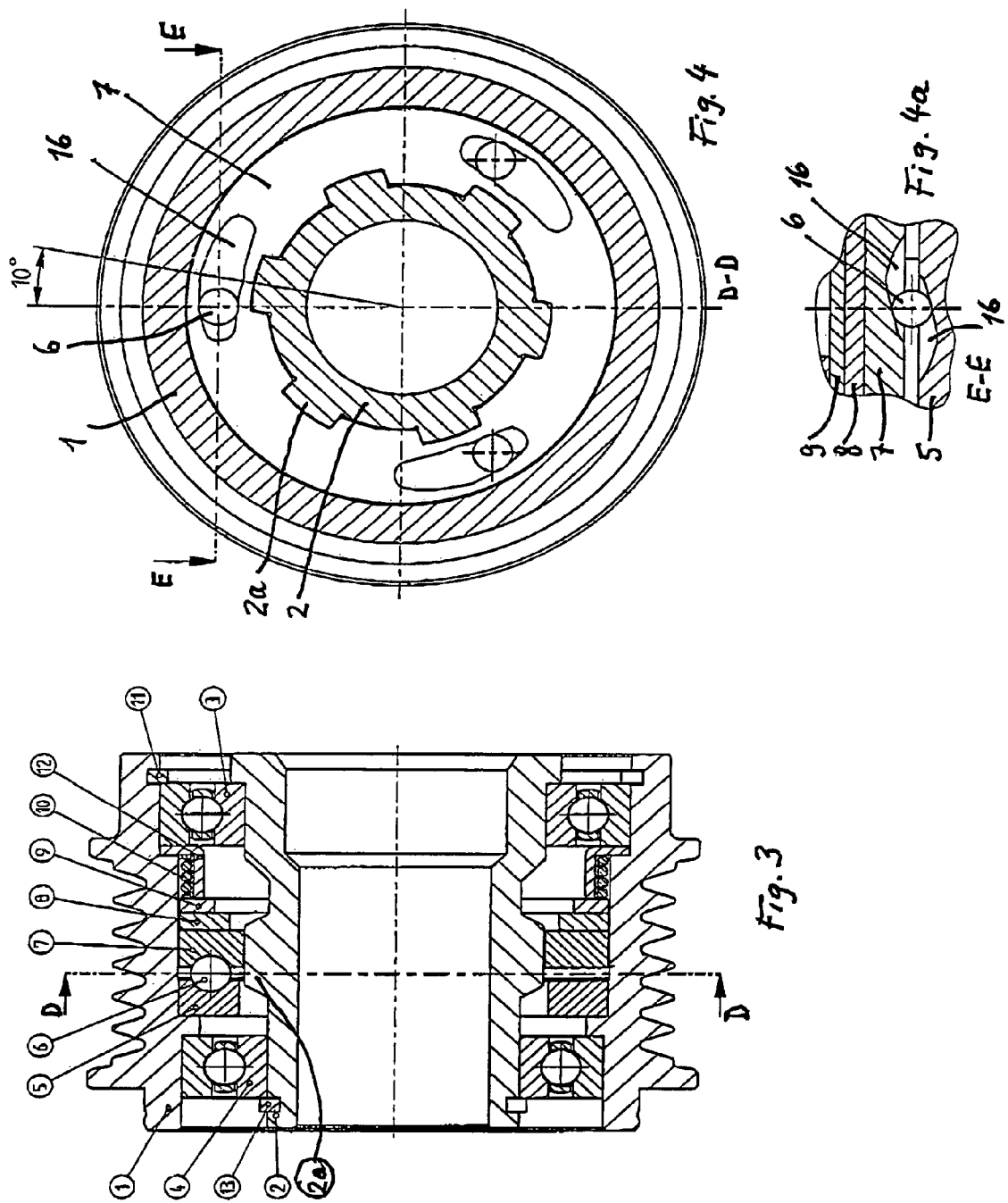

APPARATUS FOR DAMPING ROTATIONAL VIBRATIONS

BACKGROUND

The invention relates to an apparatus for damping rotational vibrations in a power train.

Such an apparatus is known from DE 195 11 188 C2. It concerns especially free-wheel pulleys which dampen rotational vibrations in a power train by means of a free-wheel clutch. The power train or traction mechanism drive therein can comprise a pulling strap, especially a profiled pulling strap, engaging at a correspondingly profiled drive pulley.

In the known apparatus the free-wheel clutch is formed as a roller free-wheel with axially arranged rollers.

For example in a reciprocating piston internal combustion engine there result, due to the pulsating operation, rotational irregularities which are transferred onto the power train and thereby to the driven unit. By means of the known solution, though, the descending branches of the rotational irregularity can be filtered out by means of the free-wheel clutch by free rotation of the rotor of the driven unit. However, with an increase of the number of revolutions of the driving element, that is particularly the reciprocating piston internal combustion engine, the rotor of the driven unit is again driven in a pulsating manner by the reaction or actuation of the free-wheel. This still leads to rotational vibrations in the driven unit and to an increased pulling force in the power train, especially in the driving strap. By the invention these disadvantages shall be eliminated and a corresponding decoupling shall be obtained.

SUMMARY

The present invention provides an apparatus for damping rotational vibrations in a power train. The apparatus generally comprises a free-wheel clutch between a driving element and a driven element, with the free-wheel clutch having first and second rings. Each ring has axial front sides facing one another, with each axial front side provided with clamping ramps that cooperate with clamping rollers positioned between the first and second rings. The first ring is connected axially undisplaceable with one of the driving or driven elements and the second ring is connected axially displaceable with the other one of the driving or driven elements. A spring element is positioned between the axially displaceable ring and an axial buttress to axially bias the axially displaceable ring.

BRIEF DESCRIPTION OF THE DRAWING FIGURES

Further details of the invention result from the following description of embodiments in view of the drawing.

FIG. 1 is a schematic longitudinal cross section of a first embodiment of the apparatus of the invention in the free-wheeling state;

FIG. 2 is a schematic axial cross section of the free-wheel clutch according to the line B—B in FIG. 1;

FIG. 2a is a simplified cross sectional view according to the line C—C of FIG. 2;

FIG. 3 is a longitudinal cross sectional view of the embodiment of FIG. 1 in the clamped condition;

FIG. 4 is a schematic axial cross section according to the line D—D of FIG. 3;

FIG. 4a is a simplified sectional view according to the line E—E of FIG. 4.

DETAILED DESCRIPTION OF THE PREFERRED EMBODIMENTS

In the shown embodiments the apparatus has a profiled pulley 1 as a drive element and an inner ring 2 as a driven element. A driving force is, for example, applied by means of a profiled strap, not illustrated, onto the driving pulley 1. From there the force is transferred to the inner ring 2, which itself is seated fixed against rotation for example on a drive shaft, not shown, of a unit to be driven, which for example can be the generator of a dynamo of an automotive vehicle.

Into the bore of the pulley 1 and onto the outer circumference of the inner ring 2 there are pressed in and pressed on, respectively, two deep groove ball bearings 3, which thus make possible the transfer of radial and axial forces from the driving strap via the pulley 1 onto the inner ring 2 and from this onto the unit to be driven. In addition, between the pulley 1 and the inner ring 2 a ramp drive or a free-wheel clutch 5, 6, 7 is provided. An outer ring 5 of the ramp drive is fixedly connected with the inner side of the pulley 1. A ramp drive inner ring 7 is arranged axially displaceable with regard to the inner ring 2. The ramp drive inner ring 7 is connected fixed against rotation with the inner ring 2 by means of a groove or channel toothing 2a which is arranged at these two parts between the ramp drive inner ring 7 and the inner ring 2 to be driven. By means of this groove or channel toothing 2a at both parts the ramp drive inner ring 7 is axially freely slideable with regard to the inner ring 2 to be driven. Between the outer ring 5 and the inner ring 7 there are provided ramp drive balls 6. Particularly, there are three such balls 6 equally distributed over the circumference.

The ramp drive outer ring 5 at its axial front side facing the ramp drive inner ring 7 is provided with a number of grooved or inclined clamping ramps 16 corresponding to the number of balls. Also the ramp drive inner ring 7 at its front side axially facing the outer ring 5 is provided in a corresponding manner with an equal number of inclined or grooved clamping ramps 16. With a neutral position of the pulley 1 opposite to the inner ring 2 the ramp drive balls 6 are lying at the deepest points between the ramps 16 on both sides. In this position the pulley 1 is freely rotatable relative to the inner ring 2 up to a certain angle (approximately 20 degrees).

Upon transmission of a driving force onto the pulley 1 this will start to rotate about its own axis. Thereby the driving force is transferred onto the ramp drive outer ring 5. The ramp drive balls 6 then move up the ramps 16, i.e. not only in circumferential direction, but additionally also in axial direction. Thereby the ramp drive inner ring 7 moves axially away from the ramp drive outer ring 5, and this occurs according to FIG. 1 towards the right into the position according to FIG. 3.

Between the ramp drive inner ring 7 and the deep groove ball bearing 3 provided at the right side thereof there are arranged a friction ring 8 and a spring element acting in axial direction, for example a helical compression spring 10 supported against the deep groove ball bearing 3. Additionally, between the friction ring 8 and the helical compression spring 10 a supporting ring 9 may be provided. A securing ring (circlip) or snap ring 11 provided in a groove at the outermost axial end secures the deep groove ball bearing 3 axially with regard to the pulley 1. Also, a securing ring (circlip) or snap ring 13 inserted at the other axial end secures the other deep groove ball bearing 4.

When a driving force is transmitted, the ramp drive inner ring 7 moves axially via the friction ring 8 and, if present, via the supporting ring 9 against the helical compression spring 10. Until then, in spite of the axial movement of these constructional parts, no rotational movement is transmitted between the ramp drive inner ring 7 and the inner ring 2. Only when the axial movement of the named parts is terminated in that the helical compression spring 10 is completely compressed winding on winding, or an abutment ring or a corresponding abutment sleeve 12 provided radially inward or outward of the helical compression spring 10 due to the axial movement of the friction ring 8 or the supporting ring 9 abuts against one of these rings, the axial movement of the ramp drive inner ring 7 and of the friction ring 8 and of the supporting ring 9, respectively, is stopped. By the axial clamping of these parts then the rotational movement is transferred from the pulley 1 and the ramp drive outer ring 5 via the clamping rollers 6 onto the ramp drive inner ring 7 and via the toothing 2a onto the inner ring 2 and from this onto the rotor shaft of the unit to be driven.

FIG. 4 shows a rotation of the inner ring 7 by for example 10 degrees relative to the outer ring 5 for reaching the clamping position of this free-wheel clutch.

By a corresponding design of the constructional parts, particularly of the spring characteristic of the helical compression spring 10, the characteristics of the friction ring 8 and the ramps 16 of the ramp drive outer ring 5 and the ramp drive inner ring 7 under consideration of the moment of inertia of the rotor to be driven (and of further characteristics of the system) the following operational conditions can be adjusted:

Damping the irregularity of the rotation in both rotational directions, damping the irregularity of the rotation in driving the inner ring 2, with free-wheel function without damping with decreasing number of revolutions of the drive of the pulley 1, for example up to a rotational angle of 20 degrees.

It should be recognized that in one embodiment, the apparatus is used in a traction mechanism drive connecting a reciprocating piston internal combustion engine and an additional unit. For example, the driving element is a drive disc and the driven element is an input shaft of the additional unit, or the driving element is a crankshaft and the driven element is a driven element of the reciprocating piston internal combustion engine.

What is claimed is:

1. Apparatus for damping rotational vibrations in a power train comprising:
    a free-wheel clutch between a driving element and a driven element, the free-wheel clutch having
    first and second rings, each ring having axial front sides facing one another,
        each axial front side provided with clamping ramps that cooperate with clamping rollers positioned between the first and second rings,
        wherein the first ring is connected axially undisplaceable with one of the driving or driven elements and the second ring is connected axially displaceable with the other one of the driving or driven elements;
    a spring element is positioned between the axially displaceable ring and an axial buttress to axially bias the axially displaceable ring; and
    an abutment is provided between the axially displaceable ring and the buttress to limit the axial movement of the spring element.

2. Apparatus according to claim 1, wherein the spring element is a helical compression spring.

3. Apparatus according to claim 1, wherein a friction ring is provided between the axially displaceable ring and the spring element.

4. Apparatus according to claim 3, wherein a supporting ring is provided between the friction ring and the spring element.

5. Apparatus according to claim 1, wherein the abutment is an abutment ring provided radially inward or outward of the spring element.

6. Apparatus according to claim 1, further comprising at least one roller bearing positioned between the driving and driven elements on at least one axial side of the free-wheel clutch.

7. Apparatus according to claim 6, wherein the at least one roller bearing is a deep groove ball bearing.

8. Apparatus according to claim 6, wherein the roller bearing is provided between the spring element and the buttress.

9. Apparatus according to claim 1, wherein the clamping rollers are formed as clamping balls.

10. Apparatus according to claim 9, wherein the axial front sides are provided each with three clamping ramps, between which three clamping balls are provided.

11. Apparatus according to claim 1, wherein the axially undisplaceable ring is connected fixed against rotation with the driving element, and the axially displaceable ring is connected with the driven element.

12. Apparatus according to claim 11, wherein the driving element is a pulley.

13. Apparatus according to claim 1, wherein the axially displaceable ring is connected fixed against rotation with its associated driving or driven element.

14. Apparatus according to claim 13, wherein the axially displaceable ring is connected fixed against rotation with its associated driving or driven element by means of an axially directed toothing.

* * * * *